March 26, 1957 T. H. FLOWERS 2,786,891

PULSE SWITCHING SYSTEMS

Filed Aug. 25, 1950 5 Sheets-Sheet 1

THOMAS H. FLOWERS

By Hall & Houghton

Attorneys

March 26, 1957 T. H. FLOWERS 2,786,891

PULSE SWITCHING SYSTEMS

Filed Aug. 25, 1950 5 Sheets-Sheet 2

THOMAS H. FLOWERS

By Hall & Houghton

Attorneys

THOMAS H. FLOWERS
By Hall & Houghton
Attorneys

INVENTOR
*Thomas Harold Flowers,*
BY *Hall & Houghton*
ATTORNEY

March 26, 1957 T. H. FLOWERS 2,786,891

PULSE SWITCHING SYSTEMS

Filed Aug. 25, 1950 5 Sheets-Sheet 5

INVENTOR

Thomas Harold Flowers,

BY Hall & Houghton

ATTORNEY 2,786,891

PULSE SWITCHING SYSTEMS

Thomas Harold Flowers, London, England

Application August 25, 1950, Serial No. 181,451
Claims priority, application Great Britain September 6, 1949
21 Claims. (Cl. 179—15)

This invention relates to electrical communication switching systems and particularly to systems comprising time-division multiplex transmission and switching apparatus as described in the specification of copending patent application Serial No. 56,619, filed October 26, 1948 (now U. S. Patent No. 2,666,809 to Flowers, issued Jan. 19, 1954).

Figure 7:
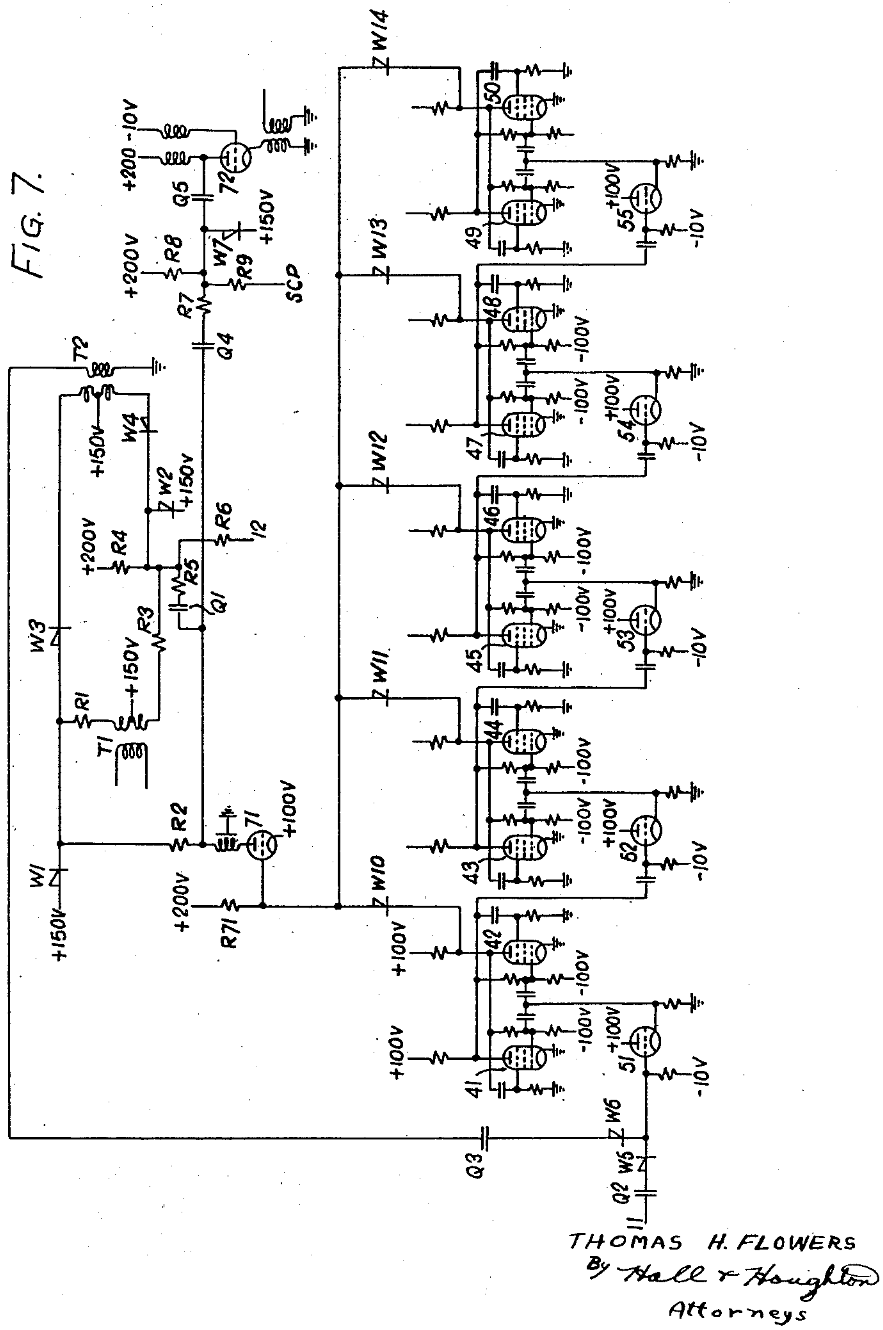
Figure 8:
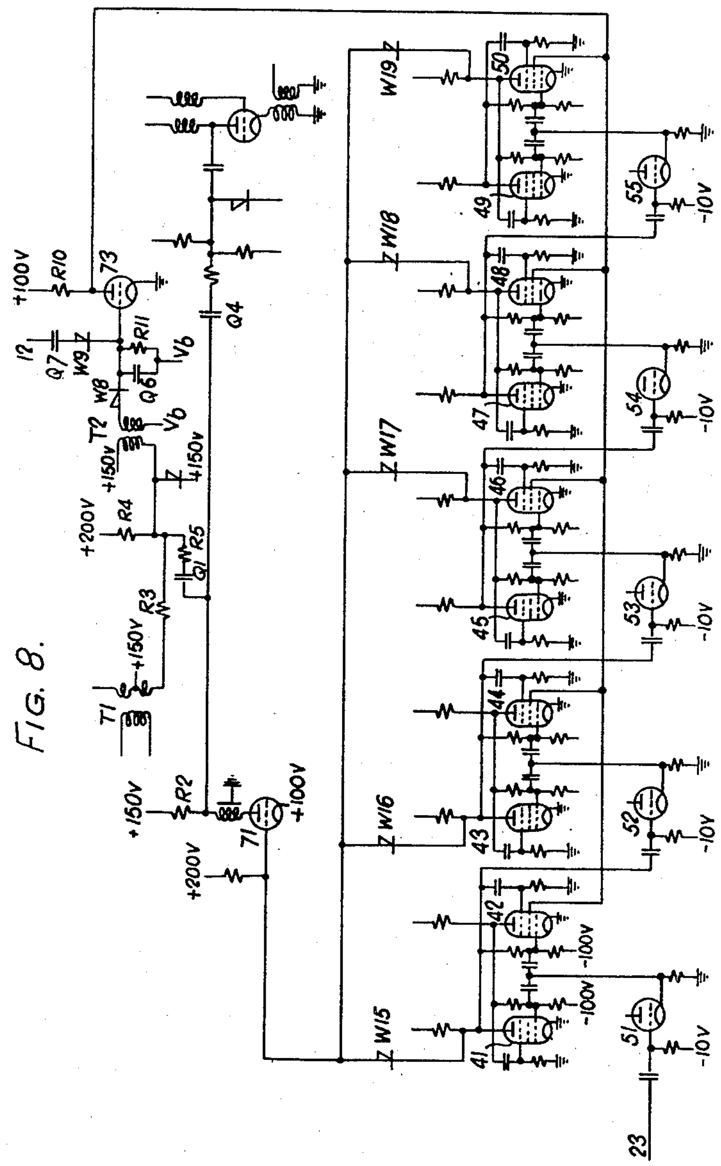
Figure 9A:
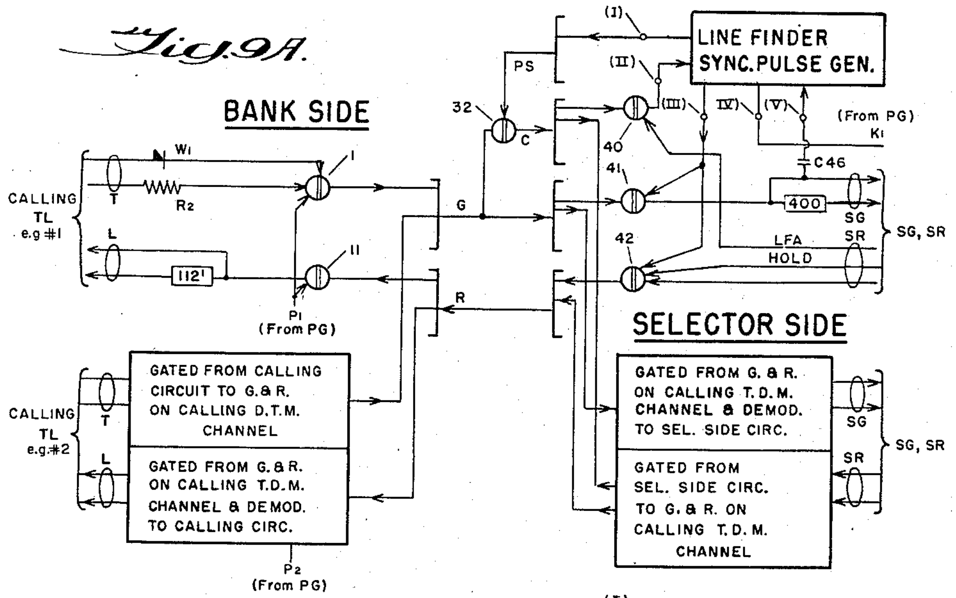
Figure 9B:
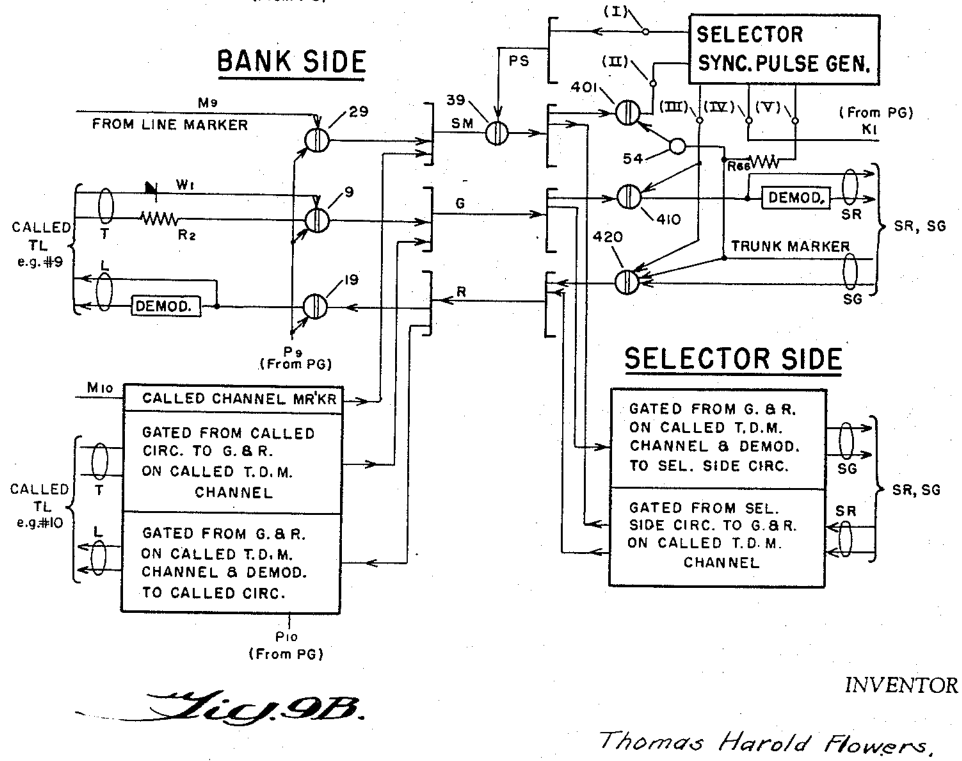
Figure 10:
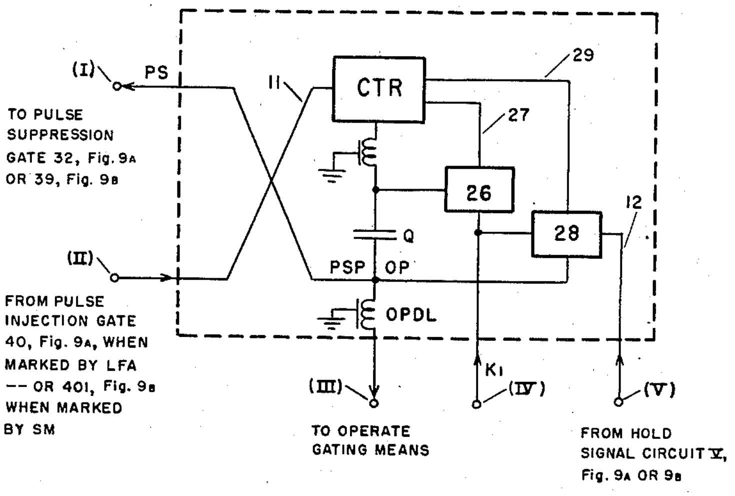

In the accompanying drawings, Figs. 1 to 8 are diagrams illustrating improvements of the present invention; Figs. 9A and 9B are skeletonized diagrams of the switches shown in Fig. 3*a* taken with Fig. 3*c* of said Flowers patent, and in Fig. 3*a* taken with Fig. 3*d* thereof, respectively, with the five leads to the synchronous pulse generators thereof marked with Roman numerals; and Fig. 10 is a block diagram showing how the improvements of the present invention are connected with said five leads to incorporate them in such switches.

As indicated in Fig. 9A, the specification referred to describes a multiplex communication system in which signals are applied to a single circuit G and a plurality of other circuits (each designated SG, SR) are each connected at desired spaced time intervals with the single circuit, intermittently actuated gating devices 41 serving to place the single circuit in operative connection with one of the other circuits at the desired time intervals. The single circuit may constitute a single highway or channel and the other circuits referred to may consist of trunks each associated with a gating device 41 arranged to control the connection of a trunk with the highway or channel, a gating device being intermittently actuated to connect a trunk to a highway for transmission of signals thereon to the trunk at such time intervals as signals appear on the highway.

The specification referred to also describes the use of a plurality of circuits (e. g. TL #1) connected to a time-division multiplex system which produces on a common highway G, which will be termed the transmission channel, a channel pulse corresponding to each circuit which is in the engaged condition, the channel pulse being amplitude modulated by the speech currents which are transmitted over the circuit. No pulse corresponding to a circuit appears on the transmission channel when the circuit is disengaged. Each pulse on the transmission channel G is communicated or not communicated to a further channel C which will be termed the calling pulse channel, in dependence on a switching device 32 not being or being actuated when the impulses of the pulse occur, the switching device being actuated over a common channel PS which will be termed the pulse suppression channel. A plurality of trunks (SG, SR) are each terminated on a line-finder (CTR—41—42) connected to the transmission, calling pulse and pulse suppression channels 41, 40, PS. A free line-finder when marked (at 40) by a trunk marker (LFA) is adapted to respond to an impulse over the calling pulse channel C and thereafter to generate a pulse the impulses of which overlay in time the impulses of a channel pulse to one of the impulses of which the line-finder has responded over the calling pulse channel.

As indicated in Fig. 9B, in the said copending application, a further plurality of trunks (e. g. TL #10), each terminated on a selector, may be connected to the transmission channel G, to the pulse suppression channel PS and to a still further channel SM over which a pulse synchronous with the channel pulse of a called circuit is communicated or not communicated by a line marker in dependence on a further switching device 39 not being or being actuated when the impulses of the pulse occur, the further switching device 39 being actuated over the pulse suppression channel PS. This still further channel SM will be termed the marking pulse channel. A free selector, when marked (at 401) by a trunk marker (SG to 401), is adapted to respond to an impulse over the marking pulse channel SM and thereafter to generate a pulse the impulses of which overlay in time the impulses of a called channel pulse.

It will be appreciated that in a system of this sort the common buses with circuits at each end gated thereto on predetermined, and on selected, time division channels respectively, constitute a switch, and for convenience of reference, that end of the switch to which circuits are gated each on its own predetermined time division channel will sometimes be called the "bank side" of the switch, and that end to which other circuits are connected on time division channels selected to synchronize with the channels of bank side circuits will sometimes be termed the "selector side" of the switch. It will be understood that a line finder is a specialized selector.

The generated pulse of both line finders and selectors in the switch systems exemplified in Figs. 9A and 9B, which will be termed the pulse suppression pulse is adapted to actuate the switching devices 40 or 401 associated with the calling pulse and marking pulse channels C and SM over the pulse suppression channel PS and in combination with further apparatus to actuate intermittently the said gating means 40, 41; 410, 420 and thus to select the required channel pulse.

The means described in the specification of the application referred to for generating the pulse suppression pulse comprise a pulse K1 common to all line-finders and selectors connected to a multiplex, the period of the common pulse K1 being equal to the spacing of the time-spaced channel pulses of the multiplex and the impulses of the common pulse being synchronised with the impulses of the channel pulses. Each line-finder and selector in the exemplary embodiment of the specification referred to includes a timing device comprising a supersonic delay line which when actuated by an impulse, produces an output impulse a predetermined time later, the timing device being actuated first by an impulse over the calling pulse or marking pulse channel C or SM and thereafter by a common pulse impulse selected by an output impulse, the output impulses constituting the pulse suppression pulse.

Referring again to Fig. 9A, it will be clear that the application referred to discloses a switch having a selector side (right of commons C, G and R), a blank side (left of commons C, G and R) and a common bus section (C, G and R) therebetween. Also that the selector side comprising a plurality of circuits each presenting outwardly extending main and signal entry trunk means (SR to 42, LFA to 40) and main and signal exit trunk means (41 to SG), while the bank side comprising a plurality of bank circuits each presenting outwardly extending main and signal entry trunk means (W1, R2 leads to each of gates 1—10) and main and signal exit trunk means (left from gates 11—20). Further, that each selector side and bank side circuit has at its inner end exit and entry trunk gating means (e. g. gates 41 and 42, and gates 1—10 and 11—20); the gating means of the several bank circuits (1—10 and 11—20) being operable in time division multiplex sequence, and the gating means of each of the selector circuits being operable in synchrony with the time division channel of any one of the bank circuits. Also that the signals from any of the bank side circuits gated to the common bus G at 1—10 are presented to the exit gates 41 of all the selector side circuits, while those from all the selector side circuits, gated to the common bus at 42, are presented to the exit gates 11—20 of all the bank circuits. Furthermore, each bank circuit comprises means (P1, P2, etc. gated respectively by gates 1—10) responsive to a signal entering through that bank side circuit (W1—R2) for initiating production of channel pulses on common bus G on its own time division channel, and each selector side circuit comprises means responsive to a signal entering through its signal entry trunk means (LFA to 40) and to channel pulses of a bank circuit (over common bus C to 40) for operating its gating means 41—42 in synchrony with such channel pulses, the switch further comprising call isolating means, shown as the pulse suppression means 32 associated with the bus C, that blocks from the signal responsive means 40 of all selector side circuits the channel pulses of a signal that has already engaged one selector side circuit.

Referring now to Fig. 9B, it will be clear that the application referred to discloses a second switch generally the same as that just discussed, having generally similar selector side circuits SG and SR, and generally similar bank side circuits, and that the two switches together, with their selector sides interconnected through SG and SR, and with controlling markers LFA and SM, constitute a switching system of an exchange.

Still referring to Figs. 9A and 9B, it is clear that in the application referred to the "line finder" (or "selector") associated with each selector side circuit constitutes a synchronous channel pulse generator, having a pulse injection gate 40 (or 401) conditioned by the marking signal from LFA (or 54) to admit a channel pulse from C (or SM), and connected for operating the selector side gates 41 and 42 (or 410, 420) in synchrony therewith.

The object of the present invention is to provide alternative means for generating the pulse suppression pulse.

According to the present invention in a modification of a system of the kind described, as exemplified in Fig. 10, the line-finder or selector includes a timing device comprising a counter CTR driven by the common pulse end of scale equal to the number of common pulse impulses occurring in the period of the channel pulses of the multiplex.

In particular applications of the invention a line-finder or selector includes a timing device comprising a counter driven by the common pulse and of scale equal to the number of common pulse impulses occurring in the period of the channel pulses of the multiplex and the timing device when actuated by an impulse produces an output impulse a predetermined time later, the timing device being actuated first by an impulse over the calling pulse C or marking pulse SM channel and thereafter by a common pulse impulse K1 selected by an output impulse, the output impulses OP constituting or controlling the pulse PS suppression pulse.

In further particular applications of the invention a line-finder or selector includes a timing device CTR, 26—29 comprising a counter CTR driven by the common pulse K1 and of scale equal to the number of common pulse impulses K1 occurring in the period of the channel pulses of the multiplex, the counter CTR being driven first by an impulse over the calling pulse or marking pulse channel C or SM and thereafter by the impulses of the common pulse K1 and producing an output impulse OP during each time that it rests in a pre-determined position, the output impulses constituting or controlling the pulse suppression pulse PS.

In still further particular applications of the invention the line-finder or selector includes a timing device comprising a counter CTR driven by the common pulse K1 and of scale equal to the number of common pulse impulses K1 occurring in the period of the channel pulses of the multiplex, the counter being driven by the impulses K1 of the common pulse commencing with the next impulse after an impulse over the calling pulse or marking pulse channel C or SM and producing an output impulse OP each time that it rests in a pre-determined position, the output impulse constituting or controlling the pulse suppression pulse PS.

The invention will be better understood from the following descriptions of particular examples, with reference to the accompanying drawings comprising Figures 1 to 8.

Counters, especially electronic counters, have appeared in many forms and it is necessary to an understanding of the invention that the term as used in this specification be defined. A counter is a device having N indicated stable states or positions and moves in a designed sequence from one state to a next state on each application of an input impulse, and indicates the state to which it has moved. Some counters are provided with a defined "home" state from which the count commences and to which they may be reset. Some of these counters may be reset substantially instantaneously from any state whilst others require to be driven over the remainder of the states, i. e. the remainder of the scale, in order to reach the "home" state. The latter are usually relatively slow in resetting.

The counters applicable to this invention are required to fulfill certain conditions. If N be the full scale of the counter and M be the number of multiplexed channels with which the selector of which the counter forms a part is to operate, then N must be equal to or greater than M. If N be equal to M then counters capable of instantaneous reset or of relatively slow reset are equally applicable. If N be greater than M then rapid reset facilities are required.

Many electronic counters suitable to the present invention are known. One is fully described in the specification of British Patent No. 584,704 and is included in the applications of the invention shown in Figs. 7 and 8. Referring to those figures, five pairs of valves are shown and numbered 41, 42 and 43, 44, . . . 49, 50. Each pair forms a binary counter and the counters are operated in series in well-known manner to form a 32-position counter. Referring to one pair, the anode of each valve is D. C. coupled to the grid of the other valve to produce a two-stable state trigger circuit. In both states one valve is conducting from anode to cathode and the other cut-off. Positive going driving impulses are applied through capacitors to the grids of both valves to change the trigger circuit from the one to the other stable state. The effect of a positive driving impulse is to cause the cut-off valve to become conducting between anode and cathode. The anode of each valve is coupled via a condenser to the suppressor grid of the other valve and the circuit is arranged so that when one valve changes from anode conduction to cut-off, the negative going impulse which is communicated to the other valve suppressor grid cuts-off the anode current from that valve even though the positive driving impulse at the control grid is causing cathode current. The binary counter will count satisfactorily if the driving impulses persist long enough for the trigger circuit to change from one stable position to the other and the suppressor grid impulses are effective for a longer time than the driving impulses, and also if only positive going impulses are applied to the grid circuits. Positive going only impulses are ensured by the cathode follower drive valves, 51 to 55, one for each binary counter, the cathode followers being normally biased to cut-off and hence insensitive to negative impulses applied to their grid circuits. The first stage counter is driven by impulses supplied externally from the counter. All other stages are driven from a previous stage to which it is coupled via a condenser.

The counter may be reset from any count to a home or 00 position in a variety of ways. In Fig. 8, the screen grids of the even numbered valves 42 to 50, are shown connected together and to a valve 73 which, when it conducts, reduces the screen voltage and thus the anode current of any said valve which may be conducting. Each trigger pair thus takes up the position in which the even numbered valve is nonconducting and remains stable in that position provided that the resetting impulse persists long enough for each stage counter to reach stability from the combined effects of the resetting impulse and any carry impulses produced as the result of resetting the previous stage. In this connection, the arrangement shown in Fig. 8 has the advantage that because the carry impulse from each stage counter is taken from the anode of the odd-numbered valve which produces a negative and therefore ineffective carry impulse when the counter is reset, there are no effective carry impulses when reset takes place and the resetting time is a minimum.

Figure 1A:
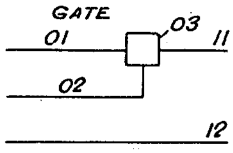
Figure 1B:
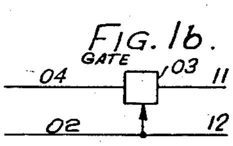
Figure 1C:
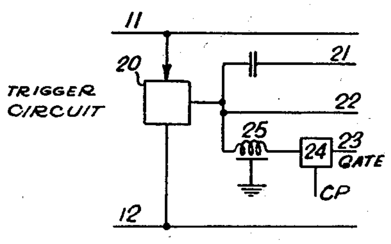

Fig. 1(*a*) shows in schematic form part of a line-finder to which the present invention may be applied. In the figure 01 is a calling pulse channel and 02 is a marker lead and both are connected to a gate circuit 03 which operates to communicate calling impulses received over the lead 01 to a lead 11 when the lead 02 is marked by a trunk marker, but to prevent the said communication when the marker lead is not marked. The lead 12 is marked with a hold signal when the line-finder responds to a calling pulse and for so long thereafter as the connection through the line-finder is required to be maintained. Fig. 1(*b*) shows in schematic form part of a selector to which the present invention may be applied. In the figure, 04 is a marking pulse channel and 02 is a marker lead and both are connected to a gate circuit 03 which operates to communicate marking impulses received over the lead 04 to a lead 11 when the lead 02 is marked, in this case, by the hold signal on the lead 12, but to prevent the said communication when the marker lead is not marked. The lead 12 is marked with a hold signal from a previous switch in the chain of switches from the calling to the called lines to initiate a connection by the selector and for so long thereafter as the connection through the selector is required to be maintained. The two leads 11 and 12 of both the line-finder and selector are therefore similar, the lead 11 receiving an impulse to start a connection and the hold lead 12 maintaining the connection for as long as is required, the only difference being that in the line-finder case the hold signal over lead 12 does not appear until after the connection has been made and in the selector case the hold signal appears before the connection has been made. The present invention is applicable to both line-finders and selector and concerns apparatus which is connected to leads such as 11 and 12 just described.

Fig. 1(*c*) shows schematically further apparatus which is suitable to some applications of the invention. Apparatus 20 is a trigger circuit connected to leads 11 and 12. The trigger circuit has two stable positions called operated and released respectively. It normally rests in the released position and is changed over to the operated position by an impulse over lead 11. It is changed back to the released position by the cessation of the hold signal over lead 12, the application of the hold signal being without effect on the trigger circuit. The trigger circuit has an output lead 22 over which is signalled the operated or released position in which the trigger circuit is reposing. Over lead 21 is communicated an impulse when the trigger circuit is operated, this being schematically represented by a series condenser.

All the circuit elements so far described schematically are described in full detail in the previously mentioned specification of copending patent application Serial No. 56,619, filed October 26, 1948. A further element shown in Fig. 1(*c*) comprises a gate circuit 24 to which is connected the lead 22 and the common pulse lead CP, the gate circuit emitting over lead 23 the impulses of the common pulse so long as the lead 22 signals the operated position of the trigger circuit 20. A starting impulse over lead 11 operates the trigger circuit and is also coincident with a common pulse impulse. To eliminate any uncertainty whether the common pulse impulse will be gated over lead 23, the lead 22 is connected to the gate circuit 24 over a delay device, for example, an electrical delay line, 25, the delay time of which is greater than the duration of the impulses of the common pulse but less than the period of the impulses. The effect is that over lead 21 is communicated an impulse substantially coincident with an impulse which operates the trigger circuit, and over lead 23 until the end of the connection is communicated the impulses of the common pulse starting with the impulse following that which is coincident with the starting impulse which operates the trigger circuit 20. These further elements need no detailed description as means for constructing them in practice are known to those skilled in the art. The signals over leads 11, 12, 21, 22 and 23 are used separately and in combination to control apparatus according to the present invention and in the following figures and descriptions are identified by the designations by which they are marked in Fig. 1.

Figures 2, 3, 4, 5, 6:
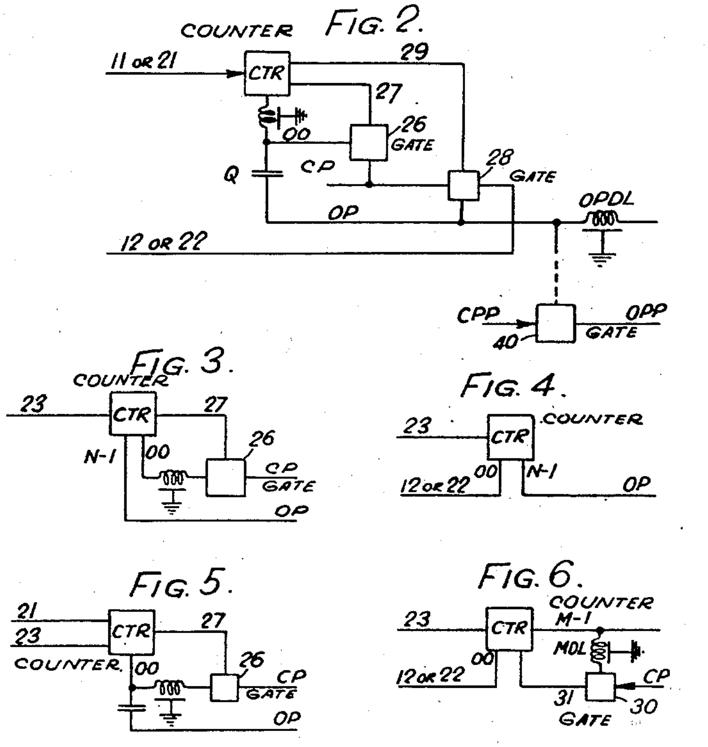

Referring now to Fig. 2, this shows a counter timing device according to the invention. A counter CTR of scale N equal to the number of common pulse impulses occurring in the period of the channel-pulses of the multiplex normally stands in its rest position designated position 00 and is advanced one position at a time by impulses applied over three leads. The counter is advanced from position 00 to position 01 first by an impulse over a lead 11 or 21. The counter signals that it is in the 00 position by a signal over lead 00 connected to a gate circuit 26 to which the common pulse CP is also connected. The gate circuit 26 is arranged to communicate common pulse impulses to a lead 27 when the counter is not in position 00 but not to communicate common pulse impulses when the counter is in position 00. Impulses over lead 27 advance the counter position by position, the action being that once the counter has left position 00 it is advanced through all the other positions until it again reaches position 00 where it will remain unless driven off by an impulse over lead 11 or 21, or over lead 29. Lead 29 connects the counter to a gate circuit 28 to which is also connected the common pulse CP, an output pulse lead OP and a lead 12 or 22. The action of the gate circuit 28 is normally to prevent common-pulse impulses from being communicated to the lead 29, but to communicate to lead 29 a common pulse impulse which coincides with both an output impulse over lead OP and a hold signal over a lead 12 or an operated signal over a lead 22. The lead OP is connected to the 00 lead by a device shown schematically as a condenser the action being that when the counter advances from the previous $(N-1)$ position to position 00 an impulse is communicated to lead OP. The action of the apparatus so far described is that when the line-finder or selector of which the apparatus forms part is idle, the counter stands on position 00. A calling or marking impulse over a lead 11 or 21 advances the counter from position 00 to 01, common pulse impulses then advancing the counter until position 00 is again reached, an impulse then being produced over lead OP. The total number of impulses supplied to the counter will at this stage be equal to the scale of the counter. The next common pulse impulse is communicated over lead 29 to advance the counter from position 00 to position 01 in the same way as the impulse over lead 11 or 21 advanced the counter from position 00 to position 01 to start the connection. The operations described will then be repeated, the counter each time it reaches position 00 being activated by a common pulse impulse selected by an output impulse over lead OP. This impulse as described, commences during or just after the Nth common pulse impulse and ends during or just after the $(N+1)$th impulse following the impulse which moved the counter from position 00 to 01. As such it is suitable, but inconveniently advanced in time for a pulse suppression pulse and also for selecting without doubt a common pulse impulse for actuating the counter. This impulse is preferably retarded by a time approximately equal to the common pulse impulse duration by a delay device in series with lead 00 to render it more suitably timed for the selection of a common pulse impulse and by a further time up to a total of approximately half the common pulse impulse period to render it more suitably timed as a pulse suppression impulse. The impulse may be further retarded by an electrical delay line OPDL as shown in the figure. Alternatively, a second common pulse CPP may be employed in conjunction with a gate circuit or impulse generator 40, for example a blocking oscillator impulse generator the length of the impulse being controlled by an electrical delay line, the impulses of the second common pulse having the same period as those of the common pulse and timed to occur approximately half a pulse period later, the gate circuit or impulse generator being connected to the pulse lead OP and the apparatus arranged so that, on coincidence at the gate circuit or impulse generator of an output impulse over lead OP and a second pulse impulse, an impulse is emitted over lead OPP. This impulse will thus be delayed with respect to the impulse over lead OP.

The apparatus of Fig. 2 may be controlled over leads 11 and 12, that is, the trigger circuit and gate circuit of Fig. 1(*c*) are not necesary but there are, however, two gate circuits in the apparatus itself. In the embodiment of the invention shown in Fig. 3, a trigger circuit and gate circuit or the like are necessary to produce on a lead 23 the common pulse commencing with the impulse following the impulse which starts the connection. There is also provided the gate circuit 26 connected to the common pulse CP and over a lead 00 to the counter and emitting over lead 27 common pulse impulses so long as the counter is not on position 00, as described with similarly designated parts for Fig. 2. There is also provided a lead $N-1$ over which a signal is given when the counter is positioned on the $(N-1)$th position. In operation, the counter normally rests on the 00 position and is driven from positions 00 to 01 by the impulses over lead 23 and from positions 01 to 00 jointly by the impulses over leads 23 and 27 until the impulses over lead 23 cease when the counter is driven to position 00 by the impulses over lead 27 and remains in position 00 until the next connexion is made. Every time the counter rests in position $(N-1)$ it emits over lead OP an output impulse which is similar to that over lead OP in Fig. 2 and may be retarded by delay line or apparatus utilising a second common pulse as described in conjunction with Fig. 2.

In Fig. 4, a simplification of Fig. 3 is made by omitting the gate circuit 26 and its associated leads and substituting a connection to the counter over a lead 12 or 22 such that in the absence of a hold signal over the lead 12 or a trigger circuit operated signal over the lead 22, the counter 23 is reset to its 00 position, the remainder of the figure being similar to Fig. 3 with corresponding parts similarly designated.

The embodiment of the invention shown in Fig. 3 requires both the 00 and the $(N-1)$ positions of the counter to be signalled. This may be avoided as shown in Fig. 5, by driving the counter from both a 21 and a 23 lead, and coupling the output pulse lead to the 00 position lead by a condenser or other means so that an output impulse is produced each time the counter runs through the 00 position but not while it rests in that position in the idle condition.

In Fig. 6 is shown schematically an embodiment of the invention comprising a counter of natural scale N which is greater than the number M as previously defined, but the natural scale N is reduced to M by a reset operation during each cycle. The counter CTR of scale N has a lead $(M-1)$ on which a signal is given when the counter is resting in position $(M-1)$. The counter normally rests in position 00 and is driven when a connexion is made by common pulse impulses over lead 23. The lead $M-1$ is connected preferably via an electric delay line MDL of delay time approximately one half the period of the common pulse impulses to a gate circuit 30 to which the common pulse is also connected, the gate circuit having the action of communicating a common pulse impulse over a lead 31 to the counter, this impulse resetting the counter to the 00 position in spite of the coincident impulse over lead 23 which tends to set the counter to position M. There is thus produced over lead $M-1$ and hence over the output pulse lead OP a pulse, the impulses of which correspond to the pulse over lead OP in Fig. 2, and can be delayed by the means described in connection with Fig. 1. A direct connection to the gate circuit 30 from delayed output pulse may then be made and the delay line individual to the gate circuit omitted. At the conclusion of a connection, when the common pulse impulses over lead 23 stop, the counter is reset to position 00 by the cessation of the hold signal over a lead 12 or a trigger circuit operated signal over a lead 22.

If the apparatus of Fig. 6 is driven by impulses over both a 23 and a 21 lead, the $M-1$ lead has to be substituted by an M lead, the counter reset cyclically to position 01 instead of 00, and the release reset remains as before at position 00.

Referring now to Fig. 7 which is a more detailed example of the embodiment of the invention schematically described in connection with Fig. 2, the counter comprising valves 41 to 55 has already been described. The lead 00 of Fig. 2 is in Fig. 7 the anode of valve 71. The cathode of valve 71 is at the same potential, shown as 100 volts above earth potential as the anode supply voltage for the binary counter valves. The control grid of valve 71 is connected through a high resistance R71 to a +200 volt supply and through rectifiers W10, W11, . . . W14, to the anodes of the even-numbered valves 42 to 50, the rectifiers being poled so that the control grid of valve 71 takes the potential of that one of said anodes which is at the lowest potential. The potential of the control grid of valve 71 is thus arranged to be below the cut-off potential if any one even-numbered valve 42 to 50 is conducting, but near cathode potential if every said even-numbered valve is cut-off. The 00 position of the counter is that position in which all even-numbered valves are non-conducting and in this position valve 71 is conducting. In all the other positions of the counter, valve 71 is cut-off.

The common pulse is applied to the primary winding of a transformer T1. The centre point of the secondary winding is connected to a +150 volt supply, the common pulse being superimposed on this voltage as a positive pulse on the upper half of the winding and a negative pulse on the lower half. The upper half winding of the transformer is connected to the equivalent of the gate circuit 26 of Fig. 1, comprising in Fig. 7, the two resistors R1 and R2 connected to the anode of valve 71, the junction of the two resistors being connected via a rectifier W1 to the +150 v. supply. The lower half winding is connected to the equivalent of the gate circuit 28 of Fig. 1 and comprising the two resistors R3 and R4 in series and connected to a +200 volt supply, the junction of these two resistors being connected via a rectifier W2 to the +150 v. supply, via a resistor R5 in series with a condenser Q1 to the anode of valve 71, and via a resistor R6 to the hold lead, 12, of Fig. 1, the hold lead being assumed to be at +150 v. potential when the line-finder or selector is engaged and at +200 v. when it is free.

Let it now be assumed that the line-finder or selector is free. The potential of the hold lead 12 is +200 v. and bias current will flow through rectifier W2. The common pulse current through resistor R3 will oppose the bias current but the bias and pulse currents are arranged so that the pulse current does not exceed the bias current. Hence the potential of the rectifier W2 does not change. Let it further be assumed that the counter is in the position 00. Then the valve 71 will be conducting between anode and cathode and the anode current flows through the biases rectifier W1. The common pulse current through resistor R1 opposes the bias but the pulse and bias currents are arranged so that the bias current exceeds the pulse current, hence the potential of the rectifier W1 does not change. Let it now be assumed that a positive going calling or marking i. e. starting impulse is received over lead 11 which is coupled by condenser Q2 and rectifier W5 to the grid circuit of the valve 51. This impulse will change the counter from the 00 position to the 01 position. Valve 71 then cuts-off its anode current and removes the bias from rectifier W1. The removal of the bias is preferably delayed as described with reference to Fig. 2, for example, by the electrical delay line shown in Fig. 7 in the anode circuit of valve 71. Common pulse impulses subsequent to the starting impulse are then able to change the potential of rectifier W1, which is coupled via a rectifier W3 to the primary winding, the centre tap of which is connected to the +150 volt supply, of a transformer T2, the secondary of which is connected, one side to earth and the other via condenser Q3 and rectifier W6 to the control grid of valve 51. The common pulse impulses communicated over this path are positive impulses which step the counter from position to position; the rectifiers W5 and W6 decouple the two sources of impulses from one another. The counter continues to step until position 00 is again reached, valve 71 then conducting, and preventing a further impulse from the common source from being communicated to the control grid of valve 51. Either prior to the starting impulse or just after, the signal over lead 12 changed from +200 v. to 150 v. and thus reduced the bias through rectifier W2, but it is arranged that the bias is not reduced to zero until a negative impulse from the anode of valve 71 and operating through condenser Q1 and resistor R5 is also added to the currents through resistors R4 and R6. This condition is attained when the valve 71 conducts, hence the next common pulse impulse will pass the rectifier W2 and be communicated via rectifier W4 to the lower half of the primary winding of the transformer T2, in the secondary of which it will induce an impulse which is positive at the control grid of valve 51 and therefore steps the counter from the 00 to the 01 position in the same way that the starting impulse did previously. The counter will thus continue to be driven from one position to the next by each common pulse impulse over either the upper or lower half primary winding of transformer T2, the rectifiers W3 and W4 de-coupling the impulses over the two halves, until the hold signal over lead 12 changes to the +200 v. release signal, when no impulse can pass to the lower half winding. Hence on release the counter is always driven to the 00 position to await a fresh call. Each time the 00 position is reached an impulse is generated at the anode of valve 71 and these impulses, as already described with reference to Fig. 1, may be used for the pulse suppression pulse directly or after being delayed electrically or in conjunction with a second common pulse.

Fig. 7 shows the last-mentioned feature. The anode of valve 71 is connected via a condenser Q4 to a gate circuit consisting of the resistors R7, R8 and R9 and rectifier W7 all having one side commoned to a common point, the other sides of these components being connected respectively to the condenser Q4, the +200 v. supply, the second common pulse lead SCP and the +150 v. supply. The rectifier W7 is thus biased from the 200 v. supply and is arranged to be unbiased by the negative impulse from the anode of valve 71. The second common pulse impulses have the same period as those of the common pulse and are displaced in time by the required amount which in practice is usually about half the pulse impulse period. The second common pulse impulse which occurs during the impulse from the anode of valve 71 produces a negative impulse at the common part of the gate circuit components and this, applied via a condenser Q5 to the anode circuit of a blocking oscillator comprising valve 72 causes an impulse to be emitted from the cathode circuit of that valve.

By choosing as the 00 position a position such that in changing from the previous position to the 00 position, only one scale of the counter has to change, the 00 position indication, in this case the conduction of valve 71, is signalled with a minimum of delay.

Referring now to Fig. 8 which is a more detailed example of the embodiment of the invention shown schematically in Fig. 6, the counter and its resetting to the 00 position have already been described. The counter has a natural scale of 32 and it is assumed in this example that a scale of 30 is required by the system. The counter is driven by impulses over a lead 23 corresponding to the lead 23 of Fig. 1(*c*), and a signal has to be given to indicate the position 29 of the counter. In position 29 valves 41, 43, 46, 48 and 50 are cut-off and the anodes of these valves are connected via rectifiers W15, W16, . . . W19 to the grid of a valve 71 in a similar manner to that described for valve 71 in Fig. 7. The anode of valve 71 is connected through resistor R2 to a +150 volt supply and to a gate circuit similar to, and with similarly designated parts to that of Fig. 7 connected to the lower half of the transformer T1, the differences being that the resistor R6 is omitted as the hold signal is applied elsewhere as described later. The anode of valve 71 is also connected to a pulse generator similar to, and with similarly designated parts to that described with reference to Fig. 7. One side of the secondary of transformer T2 in Fig. 8 is connected via an impulse lengthener circuit consisting of rectifier W8, condenser Q6 and resistor R11 to the grid circuit of a valve 73 the anode of which is connected to the screen grids of the even-numbered valves 42 to 50 and via a resistor R10 to the +100 v. supply, the other side of the secondary winding being connected to a negative bias voltage $V_b$ which normally causes the anode current of valve 73 to be cut off. The control grid of valve 73 is also connected via a rectifier W9 and condenser Q7 to the lead 12 over which the hold and release signals are communicated; these signals may be respectively +150 v. and +200 v. as described for Fig. 7.

In operation, the counter is normally in the 00 position when the line-finder or selector of which it forms part is idle. When a call is made, common pulse impulses are communicated over the lead 23 to the input to the counter and the counter steps from one position to the next for each impulse. Each time the counter reaches position 29 the valve 71 cuts off and thus causes the next common pulse impulse to be communicated over transformer T2 as a positive impulse to the impulse lengthener, the lengthened impulse being applied to the grid circuit of valve 73 which is thus caused to conduct on its anode circuit and thus to reset the counter to the 00 position. The reset impulse is lengthened so that it overrides the common pulse over lead 23 which occurs at the same time as the common pulse impulse which is gated to valve 73 to reset the counter to position 00.

At the anode of valve 71 there is thus produced a pulse which may be used for the pulse suppression pulse or in conjunction with a second common pulse to operate an impulse generator as described with reference to Fig. 7 and shown in Fig. 8 by similarly designated components. On release the common pulse impulses over lead 23 cease and the hold signal over lead 12 changes from +150 to +200 volts. A positive impulse is thus communicated over condenser Q7 and rectifier W9 to the grid of valve 73 which thus conducts and resets the counter to the 00 position.

In Figures 7 and 8, the screen grids of some of the pentode valves are not shown connected to a supply voltage. These and other details, for example, decoupling means which have been omitted to simplify the drawings, will be apparent to those skilled in the art.

I claim:

1. A switch having a selector side, a bank side, and a common bus section therebetween; the selector side comprising a plurality of circuits each presenting outwardly extending main and signal entry trunk means and main and signal exit trunk means for conveying signals to and from the switch; the bank side comprising a plurality of bank circuits each presenting outwardly extending main and signal entry trunk means and main and signal exit trunk means for conveying signals to and from the switch; and each of said circuits having at its inner end entry and exit trunk gating means; the gating means of the several bank circuits being operable in time division multiplex sequence for producing signal pulses on different time division channels at the inner end of each bank circuit, and the gating means of the several selector circuits each being operable on any selected one of said time division channels; the common bus section comprising common bus means for receiving gated signals from any number of the bank circuits, each as channel pulses on its own time division channel, and presenting the same to the exit gating means of all the selector circuits, and the bus section further comprising common bus means for receiving gated signals from any number of selector circuits, each as channel pulses on its selected time division channel, and presenting the same to the exit gating means of all the bank circuits; each bank circuit comprising means responsive to a signal entering therethrough for initiating the production on the first common bus means of channel pulses on its own time division channel; and each selector circuit comprising a counter and counter control means responsive to a marking signal and to channel pulses of a bank circuit for initiating operation of said counter and driving the same step-by-step through at least one cycle comprising one step for each pulse of all of the time division channels of the switch, said counter producing output pulses for operating the gating means of the selector circuit in synchrony with the initiating channel pulses thereby to establish communication between the bank and selector circuits being synchronously gated to the common bus means.

2. A switch according to claim 1, said counter control means comprising means marked by a hold signal and when so marked responsive to said output pulses for continuing the operation of said counter through repeated cycles.

3. A switch according to claim 1 further comprising a pulse suppression gate for gating channel pulses to the counter control means, and in which each selector circuit further comprises means for delivering to said pulse suppression gate pulse suppression pulses produced by said counter for suppressing transmission of corresponding channel pulses to the counters when one counter has responded thereto.

4. A switch according to claim 1 in which the common bus means comprises a pulse channel marking bus for presenting channel pulses of the bank circuits to the counters for initiating operation of a counter, and in which the switch further comprises means responsive to output pulses delivered by a counter in synchrony with a channel pulse, for suppressing transmission of like channel pulses through said pulse channel marking bus.

5. A switch according to claim 1 in which said counter control means comprises a re-cycle gating means responsive to the counter output pulses for gating a recycling pulse thereto, and in which said re-cycle gating means is rendered operable by a mark derived from the channel pulses gated to the exit trunk of the selector by operation of said counter.

6. In a communication system, a time division multiplex switching apparatus, a plurality of circuits, a common signal circuit, gate circuit means in each of said plurality of circuits for establishing connection of the individual circuits of said plurality of circuits to said common signal circuit, means for generating channel pulse trains corresponding to said individual circuits, means for applying said channel pulse trains to said gate circuit means, a calling pulse train channel, switching means responsive to pulses of said channel pulse trains and serving to control the communication of pulses in said common signal circuit to said calling pulse train channel, a pulse train suppression channel for controlling said switching means, a line finder, means for connecting said line finder to said common signal circuit, said calling pulse train channel and said pulse train suppression channel, pulse suppression pulse train generating means including means for rendering said line finder responsive to a pulse in said calling pulse train channel and common pulse train generating means, a timing device in said line finder, said timing device comprising a counter, means for applying said common pulse train to drive said counter, said counter being of scale equal to the number of common pulse train pulses occurring in the period of said channel pulse trains and means for utilising said pulse suppression pulse train to effect intermittent actuation of said gate circuit means.

7. A communication system according to claim 6 in which said timing device comprises means responsive to a calling pulse over the calling pulse channel for driving the counter and for producing an output pulse a predetermined time later, means responsive to said output pulse for selecting a common pulse train pulse from said common pulse train generating means, and means for supplying the so selected common pulse train pulse to said pulse responsive means, said pulse responsive means, after initial response to said calling pulse being responsive to the so selected common pulse, said output pulses constituting said pulse suppression pulse train.

8. A communication system according to claim 6 in which said counter comprises means by which it is driven first by a pulse over the calling pulse channel and thereafter by the pulses of the common pulse train and produces an output pulse during each time that it rests in a predetermined position, the output pulses constituting the pulse suppression pulse train.

9. A communication system according to claim 6 in which said counter comprises means by which it is driven by the pulses of the common pulse train commencing with the next pulse after a pulse over the calling pulse train channel and produces an output pulse each time that it rests in a predetermined position, the output pulses constituting the pulse suppression pulse train.

10. A communication system according to claim 6, said counter having a number of counting stages at least equal to the number of common pulse train pulses occurring in the period of the channel pulse trains.

11. A communication system according to claim 6, said counter having a number of counting stages equal to the number of common pulse train pulses occurring in the period of the channel pulse trains, and said counter comprising automatic resetting means operable within the period of the common pulse train.

12. A communication system according to claim 6, said counter having a number of counting stages equal to the number of common pulse train pulses occurring in the period of the channel pulse trains, and said counter comprising automatic resetting means operable relatively slowly compared to the period of the common pulse train.

13. A communication system according to claim 6, said counter having a number of counting stages greater than the number of common pulse train pulses occurring in the period of the channel pulse trains, and said counter comprising automatic resetting means operable within the period of the common pulse train.

14. In a communication system, a time division multiplex switching apparatus, a plurality of circuits, a common signal circuit, gate circuit means in each of said plurality of circuits for establishing connection of the individual circuits of said plurality of circuits to said common signal circuit, means for generating channel pulse trains corresponding to said individual circuits, means for applying said channel pulse trains to said gate circuit means, a called channel marker, a marking pulse train channel, switching means responsive to pulses of said channel pulse trains and serving to control the communication of pulses from the called channel marker through the marking pulse train channel, a pulse train suppression channel for controlling said switching means, a selector, pulse gate means for connecting said selector to said common signal circuit and said marking pulse train channel, means connecting said selector to said pulse train suppression channel, pulse suppression pulse train generating means including means for rendering said selector responsive to a pulse in said marking pulse train channel and common pulse train generating means, a timing device in said selector, said timing device comprising a counter, means for applying said common pulse train to drive said counter, said counter being of scale equal to the number of common pulse train pulses occurring in the period of said channel pulse train and means for utilizing said pulse suppression pulse train to effect intermittent actuation of the pulse gate means connecting said selector to said common signal circuit.

15. A communication system according to claim 14 in which said timing device when actuated by a pulse produces an output pulse a predetermined time later, said timing device comprising means by which it is actuated first by a pulse over the marking pulse train channel and thereafter by a common pulse train pulse, selected by an output pulse, the output pulses constituting said pulse suppression pulse train.

16. A communication system according to claim 15 in which said timing device comprises means responsive to a marking channel pulse for driving the counter and for producing an output pulse a predetermined time later, means responsive to said output pulse for selecting a common pulse train pulse from said common pulse train generating means, and means for supplying the so selected common pulse train pulse to said pulse responsive means; said pulse responsive means, after initial response to said marking channel pulse, being responsive to the so selected common pulse, said output pulses constituting said pulse suppression pulse train.

17. A communication system according to claim 14 in which said counter comprises means by which it is driven by the pulses of the common pulse train commencing with the next pulse after a pulse over the marking pulse train channel and produces an output pulse each time that it rests in a predetermined position, the output pulses constituting the pulse suppression pulse train.

18. A communication system according to claim 14, said counter having a number of counting stages at least equal to the number of common pulse train pulses occurring in the period of the channel pulse trains.

19. A communication system according to claim 14, said counter having a number of counting stages equal to the number of common pulse train pulses occurring in the period of the channel pulse trains, and said counter comprising automatic resetting means operable within the period of the common pulse train.

20. A communication system according to claim 14, said counter having a number of counting stages equal to the number of common pulse train pulses occurring in the period of the channel pulse trains, and said counter comprising automatic resetting means operable relatively slowly compared to the period of the common pulse train.

21. A communication system according to claim 14, said counter having a number of counting stages greater than the number of common pulse train pulses occurring in the period of the channel pulse trains, and said counter comprising automatic resetting means operable within the period of the common pulse train.

References Cited in the file of this patent

UNITED STATES PATENTS

| | | |
|---|---|---|
| 2,492,179 | Ransom | Dec. 27, 1949 |
| 2,492,344 | Adams | Dec. 27, 1949 |
| 2,506,612 | Ransom | May 9, 1950 |
| 2,520,132 | Deloraine | Aug. 29, 1950 |